6366X
W. Emmon.
Thrashing Mach.
Patented Feb. 7, 1831.
Fig. 2.
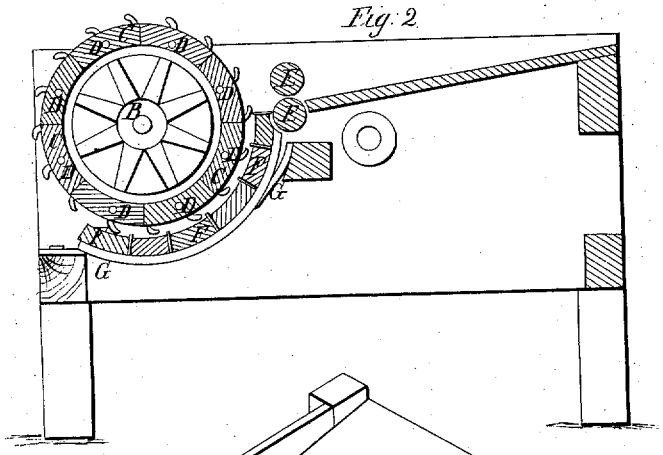
Fig. 3.
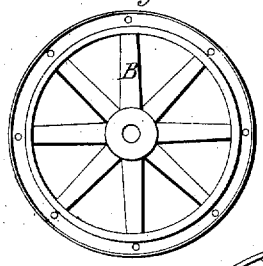
Fig. 1.
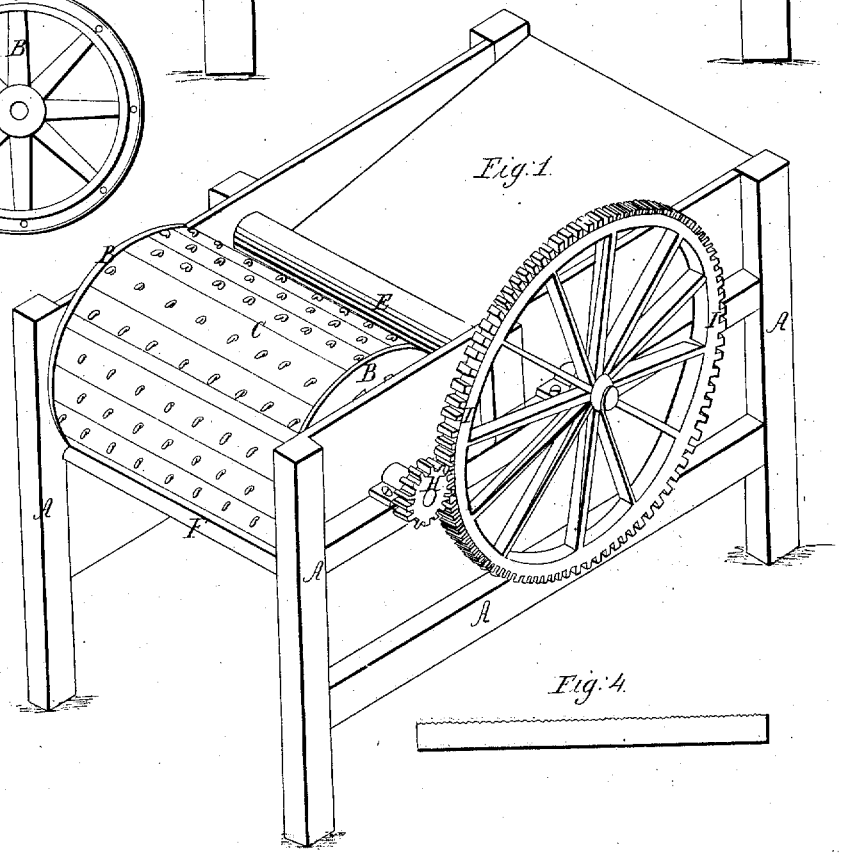
Fig. 4.

6366X William Emmons A Citizen of →

Letters Patent.

The schedule referred to in these Letters Patent and making part of the same, containing a description in the words of the said William Emmons, himself of his Improvement in the Threshing Machine.

To all to whom these presents shall come. Be it known that I William Emmons, of the City of New York the County and State of New York, have invented a new and useful improvement in threshing grain, and the following is a full and exact description of the construction and operation of the said machine, as invented or improved by me; called The Cylinder Threshing Machine; Specified in the words following. Viz. This improvement consists, 1st of a frame of suitable size and dimensions to contain the operative parts 2d A cylinder of from 18 to 22 inches diameter and from 18 to 30 inches in length and constructed in the following manner, viz. Two cast iron wheels with arms hubs &c, with a groove in one side of each of their ~~[illegible]~~ rims. These wheels are placed on a shaft at such distance apart as to be the length of the cylinder. In these grooves are inserted the ends of the staves which compose the cylinder — rods or bolts pass through the rims or arms of said wheels, from one to the other, with a screw and nut, to draw the cylinder together, which secures the staves of the cylinder in their place. 3d In the periphery of the cylinder is inserted 12 to 16 rows of teeth, of from 1 to 1½ inch projection, usually made of ⅜ inch iron rods, and headed to prevent their getting loose. The teeth are bent a semicircle, the points standing back from the grain. 4th The circular bed is formed of staves, about one third the circumference of the Drawing 6366x Feb. 7, 1831 of the cylinder and placed under the cylinder beginning from the feeding rollers, on the edges of from 6 to 8 of the staves is screwed strips of hoop iron, with ~~with~~ their edges notched and projecting up so as to come almost in contact with the teeth of the cylinder. The circular bed is set upon four springs which are fastened to two pieces that extend across the Machine from one end to the other, and fastened to the girts of the frame. 5th The Machine is fed with grain in a manner common with other Machines, viz. on an inclined board conductor in which the grain is fed into the Machine between feeding rollers, which are sometimes fluted or strips of iron inserted to keep the grain from slipping.
6th On the cylinder shaft is a pinion in which mashes a wheel about three feet or more in diameter, which is hung on a shaft that lies across the Machine, under the conduc-tor on this shaft are two rollers or pulleys, over which is bands pass to each of the feeding rollers. This machine may be made of any size or dimensions according to the power and extent of its business - it can be drove by hand, or horse, or any other power. Now what I consider and claim as my improvement and for which I solicit a Patent is as follows. 1st The peculiar construction of the cylinder, in contra distinction from any other before known.
2d The form of the teeth turning back a semicircle -
3d The form and construction of the circular bed with the teeth and the manner of setting it by springs as above described. In testimony that the above is a true speci-fication of my said improvement as above described. I have hereunto set my hand and seal, this fifteenth day of January, one thousand eight hundred and thirty one.

Witnesses
Uri Emmons
Joshua Hart

William Emmons